United States Patent
Tsai

(10) Patent No.: US 8,855,484 B2
(45) Date of Patent: Oct. 7, 2014

(54) METHOD FOR CONTROLLING OPTICAL POWER AND EXTINCTION RATIO OVER ENTIRE TEMPERATURE RANGE

(75) Inventor: Wei-Hung Tsai, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 134 days.

(21) Appl. No.: 13/584,952

(22) Filed: Aug. 14, 2012

(65) Prior Publication Data

US 2013/0230314 A1 Sep. 5, 2013

(30) Foreign Application Priority Data

Mar. 5, 2012 (TW) .............................. 101107290 A

(51) Int. Cl.
  *H04B 10/08* (2006.01)
  *H04B 17/00* (2006.01)
  *H04B 10/00* (2013.01)

(52) U.S. Cl.
  USPC .............. 398/25; 398/135; 398/136; 398/138

(58) Field of Classification Search
  USPC ......................................... 398/135, 136, 138
  See application file for complete search history.

(56) References Cited

U.S. PATENT DOCUMENTS

| | | | |
|---|---|---|---|
| 8,687,969 B2* | 4/2014 | Ekkizogloy et al. | 398/139 |
| 2005/0201761 A1* | 9/2005 | Bartur et al. | 398/197 |
| 2007/0286609 A1* | 12/2007 | Ikram et al. | 398/197 |
| 2008/0069569 A1* | 3/2008 | Nelson et al. | 398/135 |
| 2008/0187319 A1* | 8/2008 | Stewart et al. | 398/136 |
| 2009/0310961 A1* | 12/2009 | Bowler et al. | 398/38 |
| 2010/0014864 A1* | 1/2010 | Hong | 398/79 |
| 2010/0054733 A1* | 3/2010 | Hosking | 398/25 |
| 2011/0038641 A1* | 2/2011 | Tanaka et al. | 398/197 |

* cited by examiner

*Primary Examiner* — M. R. Sedighian
*Assistant Examiner* — Mina Shalaby
(74) *Attorney, Agent, or Firm* — Bacon & Thomas, PLLC

(57) ABSTRACT

The present invention is to provide a method applicable to a fiber-optic transceiver including a transmitter optical subassembly (TOSA) provided therein with a laser diode, but without a monitoring photodiode, a laser driver controlled by a controller IC for driving the laser diode to generate a laser beam, and a thermal sensor for sensing temperature of the laser diode. The method includes executing an approximation process to characteristic data, i.e. threshold currents of the laser diode at a plurality of specific temperatures and corresponding slope efficiencies (SE), provided by manufacturer for obtaining relationship therebetween over entire temperature range, manually adjusting operation parameters (such as bias current and modulation current) of the laser diode for generating expected optical power and extinction ratio at a normal temperature and for subsequently determining the operation parameters over the entire temperature range, and writing the relationship and operation parameters thus obtained into the controller IC.

6 Claims, 5 Drawing Sheets

METHOD FOR CONTROLLING OPTICAL POWER AND EXTINCTION RATIO OVER ENTIRE TEMPERATURE RANGE

FIELD OF THE INVENTION

The present invention relates to a method for controlling optical power and extinction ratio over entire temperature range, more particularly to a method applicable to a fiber-optic transceiver for automatically controlling optical power and extinction ratio of a laser beam generated over entire temperature range and thereby keeping the optical power and extinction ratio at expected optimal levels, without using a monitoring photodiode, a lookup table, or a closed-loop control circuit, so as to allow the fiber-optic transceiver to be readily applied to a fiber-optic communication system at a minimum cost.

BACKGROUND OF THE INVENTION

Recent years have seen unprecedented dramatic changes in the communication transmission field due to continuous and rapid development of electronic and material technologies. The two major trends of such changes are: the gradual replacement of the traditional wired transmission systems by their wireless counterparts, whose transmission medium is the air; and the gradual replacement of the traditional metallic-medium-based telecommunications systems by their fiber-optic counterparts, which transmit optical signals through optical fibers.

Take the fiber-optic telecommunication systems for example. Thanks to the development of fiber-optic materials, fiber-optic telecommunication has reached maturity in both theory and application since the 1960s. Optical fibers feature a small diameter, light weight, ample sources of materials, and a strength comparable to that of copper wires. Therefore, when used in data transfer, optical fibers have such advantages as large bandwidths, low losses, and high resistance to electromagnetic interference. As people demand larger and larger amounts of data be transferred at increasingly higher transfer rates, optical fibers undoubtedly provide the best solution to innovation of the existing communication systems. In a fiber-optic communication system, fiber-optic transceivers are critical components on which the quality of optical signal transmission depends. As shown in FIG. 1, the fiber-optic transceiver 100 is connected to an electronic device (not shown) and is controlled thereby to generate or receive a laser beam. The fiber-optic transceiver 100 essentially includes a controller IC 101, a laser driver 102, a transmitter optical subassembly (TOSA) 103, a post-amplifier 104, a receiver optical subassembly (ROSA) 105, and a thermal sensor 106. The TOSA 103 is provided therein with a laser diode 1031, a monitoring photodiode 1032, and a post-system-on-chip controller (post-SoC controller) 1033. The ROSA 105 is provided therein with a photo-detector 1051 and a pre-amplifier 1052. The laser driver 102 is configured for providing, under control of the controller IC 101, a direct-current (DC) bias current to the laser diode 1031, thereby driving the laser diode 1031 to generate a laser beam, which is transmitted outward through an optical fiber 201. The photo-detector 1051 is configured for measuring the laser beam transmitted from another optical fiber 202, and this laser beam is sequentially amplified by the pre-amplifier 1052 and the post-amplifier 104 before it is delivered to the controller IC 101. The thermal sensor 106 serves to measure the working temperature of the laser diode 1031. The monitoring photodiode 1032 and the post-SoC controller 1033, on the other hand, serve to monitor the laser beam generated by the laser diode 1031.

Conventionally, referring again to FIG. 1, the controller IC 101 corrects its control signal to the laser driver 102 according to the working temperature of the laser diode 1031 measured by the thermal sensor 106. Thus, temperature compensation is performed on the bias current or modulation current generated by the laser driver 102, allowing the laser beam generated by the laser diode 1031 to have the optimal optical power and extinction ratio (ER) in different temperature ranges. Some fiber-optic transceivers are so designed that the thermal sensor 106 is directly provided in the laser driver 102 or the TOSA 103. The controller IC 101 also determines whether the laser beam monitored by the monitoring photodiode 1032 is normal in terms of brightness and stability. Then, the controller IC 101 adjusts its control signal to the laser driver 102 accordingly to correct the current generated by the laser driver 102, with a view to keeping the current in a correctly stable state.

As abnormality in laser beam brightness or stability results mainly from a high or low working temperature of the laser diode 1031, one effective approach to increasing the performance and service life of the fiber-optic transceiver 100 is to make a lookup table of the operation parameters of the laser diode 1031 at different working temperatures. Once the lookup table is available, the controller IC 101 can search the lookup table for the operation parameters corresponding to the current temperature of the laser diode 1031 and adjust the control signal according to the operation parameters. This ensures that the current generated by the laser driver 102 will cause the laser diode 1031 to emit a laser beam having the optimal optical power and extinction ratio regardless of the working temperature of the laser diode 1031. In other words, temperature compensation will be effectively carried out to greatly enhance laser beam stability.

According to the above, in order for the fiber-optic transceiver 100 to control the laser driver 102 in such a way that the optical power and extinction ratio of the laser beam generated by the laser diode 1031 stay at the optimal levels throughout an entire temperature range, either of the following two schemes can be used:

(1) The controller IC 101 uses the monitoring photodiode 1032 in conjunction with a closed-loop control circuit (not shown) to monitor the laser beam generated by the laser diode 1031. Then, the controller IC 101 controls the laser driver 102 according to the monitoring result so that the optical power and extinction ratio of the laser beam generated by the laser diode 1031 remain at the optimal levels.

(2) The controller IC 101 measures the current working temperature of the laser diode 1031 with the thermal sensor 106, checks a pre-set lookup table in the controller IC 101 for the operation parameters corresponding to the current working temperature of the laser diode 1031, and controls the laser driver 102 according to the operation parameters so that the optical power and extinction ratio of the laser beam generated by the laser diode 1031 stay optimal.

However, no matter which of the foregoing schemes is used, the fiber-optic transceiver 100 cannot control the optical power and extinction ratio of a laser beam over an entire temperature range unless: (1) the TOSA 103 is provided therein with the monitoring photodiode 1032 and the post-SoC controller 1033 for monitoring the laser beam generated by the laser diode 1031, and (2) the closed-loop control circuit is precisely designed and is configured for fast response; or unless repeated tests have been conducted on the laser diode 1031 to obtain a large amount of data that correspond to the operation parameters in the entire temperature range. All of the above not only adds to the complexity and cost of the fiber-optic transceiver 100 in both design and manufacture, but also causes a lot of trouble to companies with limited chip design capabilities.

Therefore, the issue to be addressed by the present invention is to make commercially available fiber-optic transceivers easily applicable to a fiber-optic communication system and to enable the fiber-optic transceivers in a fiber-optic communication system to control the optical power and extinction ratio of a laser beam automatically, rapidly, and cost-effectively in the absence of the monitoring photodiode 1032, the aforesaid lookup table, and the aforesaid closed-loop control circuit, thereby keeping the optical power and extinction ratio of the laser beam at the expected optimal levels over an entire temperature range.

BRIEF SUMMARY OF THE INVENTION

The primary object of the present invention is to provide a method for controlling optical power and extinction ratio over entire temperature range, and the method is applicable to a fiber-optic transceiver. The fiber-optic transceiver is connected to an electronic device and is controlled thereby to generate or receive a laser beam. The fiber-optic transceiver includes a transmitter optical subassembly (TOSA), a laser driver, a controller IC, and a thermal sensor. The TOSA is provided therein with a laser diode but can do without a monitoring photodiode. The laser driver, which is controlled by the controller IC, drives the laser diode to generate a laser beam, which is propagated outward through an optical fiber. Last but not least, the thermal sensor senses the temperature of the laser diode. The method is based on the characteristic data of the laser diode as provided by the manufacturer at the time of shipment—namely the threshold currents of the laser diode at a plurality of specific temperatures and the corresponding slope efficiencies (SE). An approximation method is applied to the manufacturer-provided characteristic data to obtain the threshold currents and the corresponding slope efficiencies in the entire temperature range. After that, the relationship between the optical power and the on-current of the laser diode over the entire temperature range is determined. Then, at a normal temperature, the bias current and modulation current of the laser diode are manually adjusted so as for the laser diode to generate the expected optical power and extinction ratio at the normal temperature. Operation parameters such as the bias current and the modulation current are subsequently determined for the entire temperature range. The relationship and operation parameters thus obtained are written into a memory of the controller IC (or of the electronic device). The controller IC obtains the current temperature of the laser diode via the thermal sensor and controls the laser driver according to the aforesaid relationship and operation parameters. Thus, the laser driver drives the laser diode to generate a laser beam having the expected optical power and extinction ratio.

More specifically, according to the method of the present invention, the manufacturer-provided characteristic data of the laser diode, i.e., the threshold currents (e.g., $I_{th}(-40°\,C.)$, $I_{th}(25°\,C.)$, and $I_{th}(85°\,C.)$) and the corresponding slope efficiencies (e.g., $SE(-40°\,C.)$, $SE(25°\,C.)$, and $SE(85°\,C.)$) of the laser diode at a plurality of specific temperatures (e.g., a low temperature $-40°\,C.$, a normal temperature $25°\,C.$, and a high temperature $85°\,C.$), are substituted into the following equations:

$$I_{th}(t) = I_0 + K_1 * \exp(t/t_1)$$

$$SE(t) = S_0 - K_s * \exp(t/t_s)$$

where $I_0$, $K_1$, $t_1$, $S_0$, $K_s$ and $t_s$ are characteristic constants. As a linear or substantially linear relationship must exist between the optical power $P(t)$ and the on-current $I(t)$ of a common laser diode within a certain temperature range, the characteristic constants in the above equations can be determined using the manufacturer-provided characteristic data. Then, by means of an approximation method, the threshold currents and the corresponding slope efficiencies in the entire temperature range can be obtained, from which the relationship between the optical power and the on-current of the laser diode over the entire temperature range can be determined.

Afterward, the bias current $I_0(t_n)$ and the modulation current $I_1(t_n)$ of the laser diode are manually adjusted at a normal temperature $t_n$ (e.g., 25° C.) so that, according to the equation:

$$P(t) = (I(t) - I_{th}(t)) * SE(t),$$

the laser diode generates the following expected optical powers $P_0(t_n)$ and $P_1(t_n)$ at the normal temperature $t_n$, wherein $P_0(t_n)$ is the optical power at which the laser diode generates a "0" digital signal at the normal temperature $t_n$, and $P_1(t_n)$ is the optical power at which the laser diode generates a "1" digital signal at the normal temperature $t_n$:

$$P_0(t_n) = (I_0(t_n) - I_{th}(t_n)) * SE(t_n) = (I_0(t) - I_{th}(t)) * SE(t)$$

$$P_1(t_n) = (I_1(t_n) - I_{th}(t_n)) * SE(t_n) = (I_1(t) - I_{th}(t)) * SE(t).$$

By manually adjusting the bias current $I_0(t_n)$ and the modulation current $I_1(t_n)$, the laser diode is also expected to generate the following extinction ratio $ER(t_n)$ at the normal temperature $t_n$:

$$ER(t_n) = 10 * \log(P_1(t_n)/P_0(t_n)).$$

Following that, the bias currents $I_0(t)$ and the modulation currents $I_1(t)$ in the entire temperature range are calculated as follows:

$$I_0(t) = I_{th}(t) + (I_0(t_n) - I_{th}(t_n)) * (SE(t_n)/SE(t))$$

$$I_1(t) = I_{th}(t) + (I_1(t_n) - I_{th}(t_n)) * (SE(t_n)/SE(t)).$$

The bias currents $I_0(t)$ and the modulation currents $I_1(t)$ in the entire temperature range can be determined using the above equations because the relationship between the optical power $P(t)$ and the on-current $I(t)$ of the laser diode over the entire temperature range has been obtained from the threshold currents $I_{th}(t)$ and the corresponding slope efficiencies $SE(t)$ in the entire temperature range.

Then, the relationship between the optical power $P(t)$ and the on-current $I(t)$ of the laser diode over the entire temperature range and the foregoing equations are written into a memory of the controller IC (or of the electronic device). Once the controller IC obtains the current temperature $t_i$ of the laser diode through the thermal sensor, the controller IC (or the electronic device) can obtain the threshold current $I_{th}(t_i)$ and the corresponding slope efficiency $SE(t_i)$ of the laser diode at the current temperature $t_i$ according to the current temperature $t_i$ and the relationship between the optical power $P(t)$ and the on-current $I(t)$ of the laser diode over the entire temperature range.

Moreover, the controller IC (or the electronic device) obtains the bias current $I_0(t_i)$ and the modulation current $I_1(t_i)$ of the laser diode at the current temperature $t_i$ according to the following equations:

$$I_0(t_i) = I_{th}(t_i) + (I_0(t_n) - I_{th}(t_n)) * (SE(t_n)/SE(t_i))$$

$$I_1(t_i) = I_{th}(t_i) + (I_1(t_n) - I_{th}(t_n)) * (SE(t_n)/SE(t_i)).$$

Subsequently, the controller IC (or the electronic device) controls the laser driver according to the bias current $I_0(t_i)$ and the modulation current $I_1(t_i)$ of the laser diode at the current temperature $t_i$, so as for the laser driver to drive the laser diode in such a way that not only does the laser diode generate a laser beam, but also the laser beam has the expected optical power and extinction ratio.

As the foregoing effects are achieved without using a monitoring photodiode, a lookup table, or a closed-loop control circuit, the present invention allows a commercially available fiber-optic transceiver to be readily applied to a fiber-optic communication system at a minimum cost. Furthermore, according to the present invention, a commercially available fiber-optic transceiver, once applied to a fiber-optic communication system, can automatically control the optical power and extinction ratio of a laser beam over an entire temperature range and thereby keep the optical power and extinction ratio at the expected optimal levels.

BRIEF DESCRIPTION OF THE SEVERAL VIEWS OF THE DRAWINGS

The technical concept and operation process of the present invention are described in more detail below by way of preferred embodiments and the accompanying drawings, in which.

DETAILED DESCRIPTION OF THE INVENTION

Figure 1:
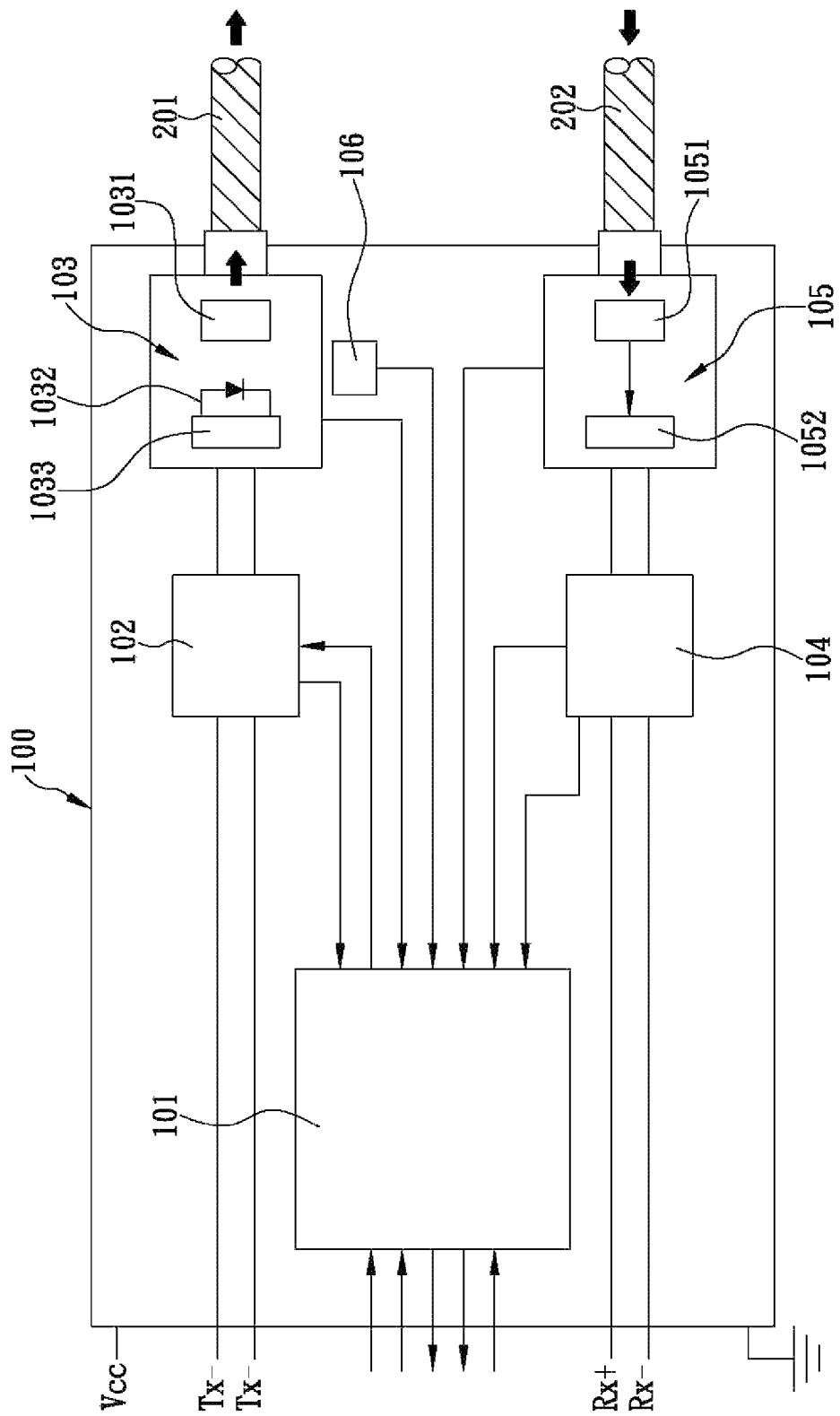
FIG. 1 schematically shows the circuit structure of a commercially available conventional fiber-optic transceiver.
Figure 2:
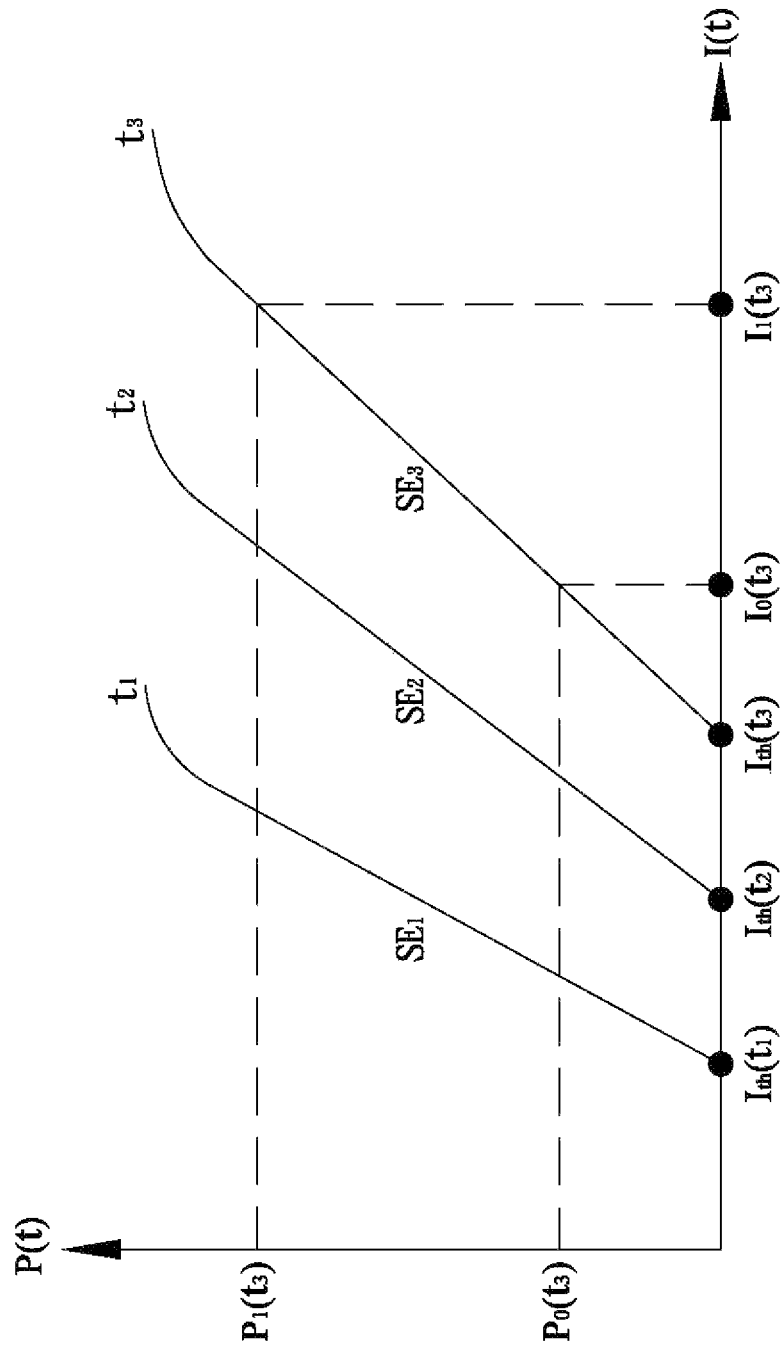
FIG. 2 shows curves representing the relationships between the optical power P(t) and the on-current I(t) of a conventional laser diode at different temperatures $t_1$, $t_2$, and $t_3$.

As stated above, the laser beams of commercially available fiber-optic transceivers tend to have abnormal brightness or poor stability, and the problems arise mainly from a high or low working temperature of laser diodes. To solve the problems, it is imperative to understand how the operation parameters of a laser diode vary at different working temperatures. Referring to FIG. 2, the curves in the drawing show the relationships between the optical power P(t) and the on-current I(t) of an ordinary laser diode at different temperatures $t_1$, $t_2$, and $t_3$, wherein the relationships can be expressed by the equation:

$$P(t)=(I(t)-I_{th}(t))*SE(t).$$

In the plot of FIG. 2, $I_{th}(t_1)$, $I_{th}(t_2)$, and $I_{th}(t_3)$ represent the threshold currents of the laser diode at different temperatures $t_1$, $t_2$, and $t_3$ respectively. $SE_1$, $SE_2$, and $SE_3$, which are respectively the slopes of the curves, represent the slope efficiencies SE(t) of the laser diode at different temperatures $t_1$, $t_2$, and $t_3$ respectively. According to FIG. 2 and the above equation, the curves are linear or substantially linear. Moreover, at any given temperature (the temperature $t_3$ in FIG. 2, for example), the bias current $I_0(t_3)$ applied to the laser diode must be greater than the threshold current $I_{th}(t_3)$ by a certain amount in order for the laser diode to generate an optical power $P_0(t_3)$ and thereby emit a digital optical signal standing for "0", and the modulation current $I_1(t_3)$ applied to the laser diode must also be greater than the bias current $I_0(t_3)$ by a certain amount in order for the laser diode to generate an optical power $P_1(t_3)$ and thereby emit a digital optical signal standing for "1".

As far as commercially available fiber-optic transceivers are concerned, it is common practice for the manufacturers to indicate the products' characteristic data either directly on the products or in their specifications when the products are shipped. The characteristic data typically include the threshold currents (e.g., $I_{th}(-40°$ C.), $I_{th}(25°$ C.), and $I_{th}(85°$ C.)) and the corresponding slope efficiencies (e.g., SE($-40°$ C.), SE($25°$ C.), and SE($85°$ C.)) at a plurality of specific temperatures (e.g., a low temperature $-40°$ C., a normal temperature $25°$ C., and a high temperature $85°$ C.). In consideration of this, the inventor of the present invention came up with the idea of making direct use of such characteristic data so that the optical power and extinction ratio of a commercially available fiber-optic transceiver is controllable over an entire temperature range by the method of the present invention. This not only allows a low-cost, commercially available fiber-optic transceiver (i.e., one without a monitoring photodiode, a lookup table, and a closed-loop control circuit) to be readily used in a fiber-optic communication system in the absence of a monitoring photodiode, a lookup table, and a closed-loop control circuit, but also enables the fiber-optic transceiver to automatically control the optical power and extinction ratio of a laser beam over an entire temperature range such that the optical power and extinction ratio remain at the expected optimal levels.

Figure 3:
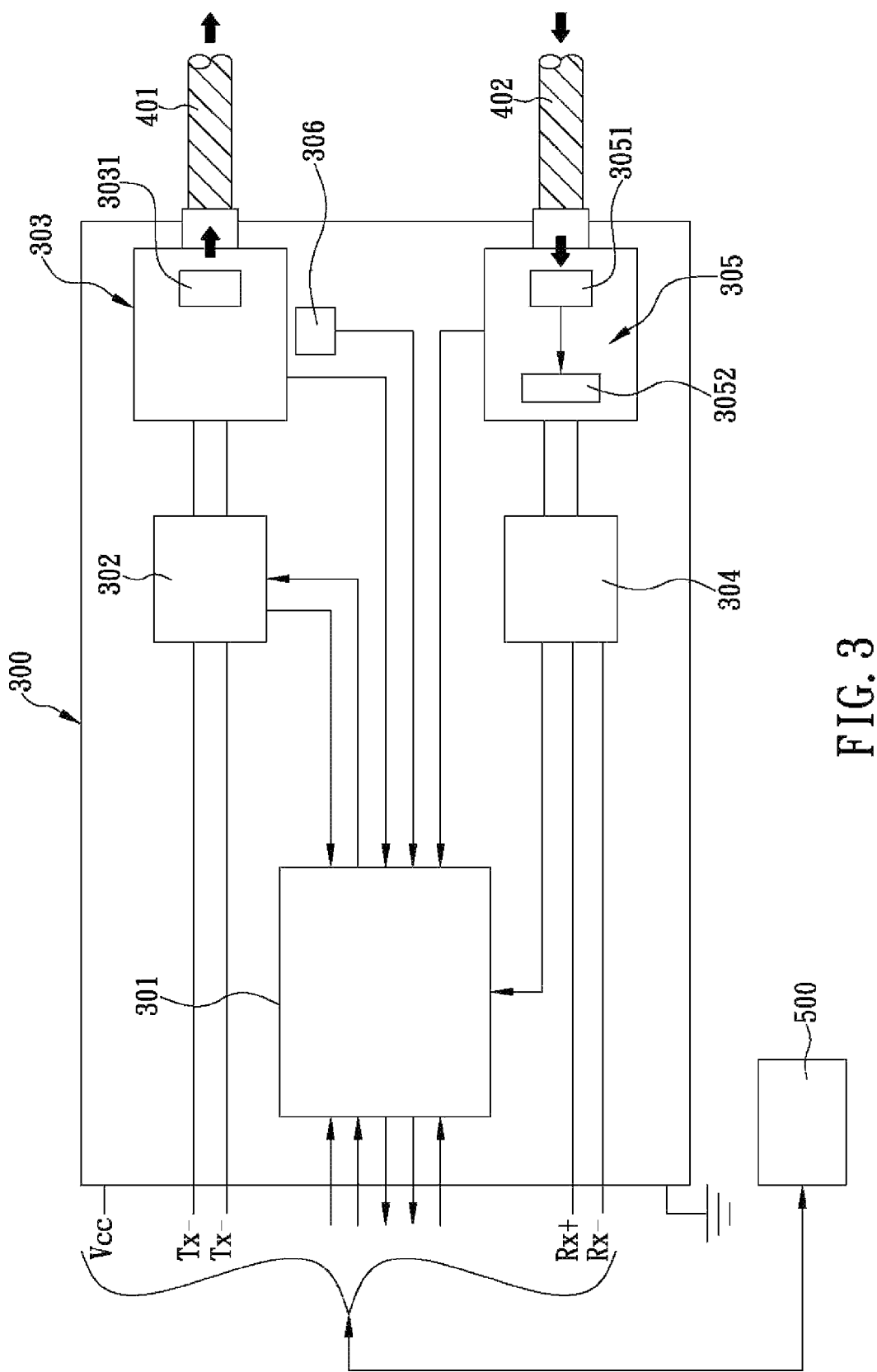
FIG. 3 schematically shows the circuit structure of the fiber-optic transceiver in a preferred embodiment of the present invention.

The present invention discloses a method for controlling optical power and extinction ratio over entire temperature range. The method is applicable to a fiber-optic transceiver 300 as shown in FIG. 3, wherein the fiber-optic transceiver 300 is connected to an electronic device 500 and can generate or receive a laser beam under control of the electronic device 500. The fiber-optic transceiver 300 includes a controller IC 301, a laser driver 302, a transmitter optical subassembly (TOSA) 303, a post-amplifier 304, a receiver optical subassembly (ROSA) 305, and a thermal sensor 306. The TOSA 303 is provided therein with a laser diode 3031 but does not require a monitoring photodiode or a system-on-chip (SoC) controller. The laser driver 302 drives the laser diode 3031 under control of the controller IC 301 so as for the laser diode 3031 to generate a laser beam to be sent out through an optical fiber 401. The ROSA 305 is provided therein with a photo-detector 3051 and a pre-amplifier 3052. The photo-detector 3051 is configured for measuring the laser beam transmitted from another optical fiber 402 and allows this laser beam to be sequentially amplified by the pre-amplifier 3052 and the post-amplifier 304 before reaching the controller IC 301. The thermal sensor 306 is configured for sensing the temperature of the laser diode 3031. It should be noted that the foregoing is only one feasible circuit structure of the fiber-optic transceiver 300, wherein the designed location of the thermal sensor 306 may vary according to practical needs. For instance, the thermal sensor 306 may be provided in the laser driver 302 or the TOSA 303 in order to measure the working temperature of the laser diode 3031 accurately.

The method of the present invention involves substituting the manufacturer-provided characteristic data of the fiber-optic transceiver 300 or of the laser diode 3031, i.e., the threshold currents (e.g., $I_{th}(-40°$ C.), $I_{th}(25°$ C.), and $I_{th}(85°$ C.)) and the corresponding slope efficiencies (e.g., SE($-40°$ C.), SE(25° C.), and SE(85° C.)) of the laser diode at a plurality of specific temperatures (e.g., a low temperature −40° C., a normal temperature 25° C., and a high temperature 85° C.), into the following Equation 1 and Equation 2. Equation 1 represents the relationship between the threshold current $I_{th}(t)$ of the laser diode 3031 and temperature t, and Equation 2 represents the relationship between the slope efficiency SE(t) and temperature t.

$$I_{th}(t)=I_0+K_1*\exp(t/t_1) \qquad \text{Equation 1}$$

where $I_0$, $K_1$, and $t_1$ are characteristic constants.

$$SE(t)=S_0-K_s*\exp(t/t_s) \qquad \text{Equation 2}$$

where $S_0$, $K_s$, and $t_s$ are characteristic constants.

Figure 4:
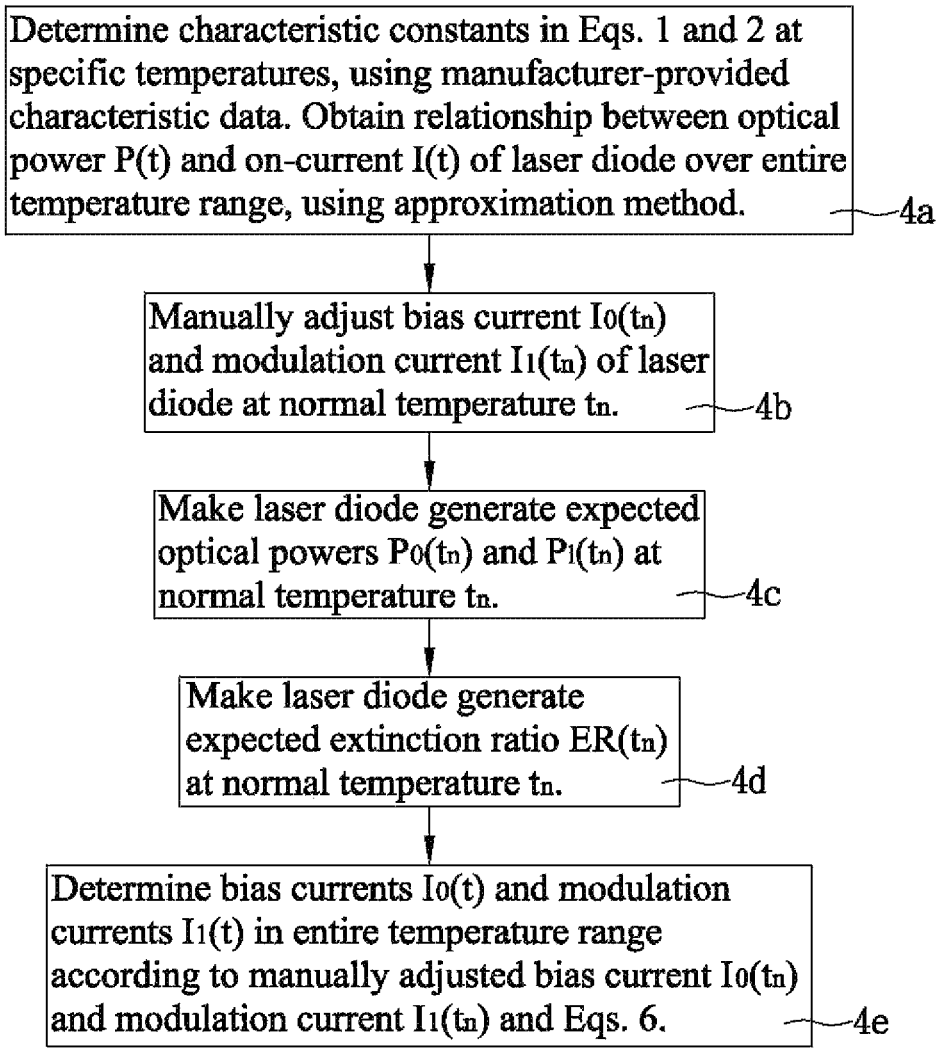
FIG. 4 is a flowchart of the steps for obtaining the threshold currents $I_{th}(t)$ and the corresponding slope efficiencies SE(t) of a laser diode in an entire temperature range and the step for applying Equations 6.

Referring to FIG. 4, the method of the present invention includes the following steps:

(4a) To begin with, as there must exist a linear or substantially linear relationship between the optical power P(t) and the on-current I(t) of a common laser diode at any given temperature t, the aforementioned manufacturer-provided characteristic data are used to determine the characteristic constants in Equation 1 and Equation 2 at the specific temperatures. Then, the threshold currents $I_{th}(t)$ and the corresponding slope efficiencies SE(t) in an entire temperature range are determined by an applicable approximation method. After that, the relationship between the optical power P(t) and the on-current I(t) of the laser diode 3031 over the entire temperature range is determined, as given by the following equation:

$$P(t)=(I(t)-I_{th}(t))*SE(t). \qquad \text{Equation 3}$$

In another preferred embodiment of the present invention, considering that different fiber-optic transceivers 300 or laser diodes 3031 have different manufacturer-provided characteristic data, three sets of manufacturer-provided characteristic data are collected from three fiber-optic transceivers 300 or laser diodes 3031. Then, the threshold currents $I_{th}(t)$ and the corresponding slope efficiencies SE(t) of the fiber-optic transceiver 300 or the laser diode 3031 in the entire temperature range are computed using the following approximation method:

(4a-1) The three sets of manufacturer-provided characteristic data are substituted into the plural known equations (e.g., the quadratic equations $I_{th}(t)=a+b*t+c*t^2$ and $SE(t)=d+e*t+f*t^2$, or other equations) of a commercially available tool software (e.g., ORIGIN 6.0).

(4a-2) Determine which ones of the known equations satisfy the three sets of manufacturer-provided characteristic data simultaneously, and choose these known equations as the applicable approximation equations.

(4a-3) By substituting three sets of threshold currents, e.g., $I_{th1}(-40°$ C.), $I_{th1}(25°$ C.), and $I_{th1}(85°$ C.); $I_{th2}(-40°$ C.), $I_{th2}(25°$ C.), and $I_{th2}(85°$ C.); and $I_{th3}(-40°$ C.), $I_{th3}(25°$ C.), and $I_{th3}(85°$ C.), into the approximation equation for calculating the threshold currents $I_{th}(t)$ in the entire temperature range (e.g., $I_{th}(t)=a+b*t+c*t^2$), the characteristic constants (e.g., a, b, and c) in the approximation equation can be determined by approximation.

(4a-4) Likewise, by substituting three sets of slope efficiencies, e.g., $SE_1(-40°$ C.), $SE_1$ (25° C.), and $SE_1$ (85° C.); $SE_2(-40°$ C.), $SE_2(25°$ C.), and $SE_2$ (85° C.); and $SE_3(-40°$ C.), $SE_3$ (25° C.), and $SE_3$ (85° C.), into the approximation equation for calculating the slope efficiencies SE(t) in the entire temperature range (e.g., $SE(t)=d+e*t+f*t^2$), the characteristic constants (e.g., d, e, and f) in the approximation equation can be determined by approximation.

(4b) Next, at a normal temperature $t_n$ (e.g., 25° C.), the bias current $I_0(t_n)$ and the modulation current $I_1(t_n)$ of the laser diode 3031 are manually adjusted, so as for the laser diode 3031 to generate the expected optical powers $P_0(t_n)$ and $P_1(t_n)$ at the normal temperature $t_n$ according to Equation 3 ($P(t)=(I(t)-I_{th}(t))*SE(t)$).

(4c) The optical powers $P_0(t_n)$ and $P_1(t_n)$ that the laser diode 3031 is expected to generate at the normal temperature $t_n$ as a result of the manually adjusted bias current $I_0(t_n)$ and modulation current $I_1(t_n)$ can be expressed by the following Equations 4 respectively:

$$P_0(t_n)=(I_0(t_n)-I_{th}(t_n))*SE(t_n)=(I_0(t)-I_{th}(t))*SE(t)$$

$$P_1(t_n)=(I_1(t_n)-I_{th}(t_n))*SE(t_n)=(I_1(t)-I_{th}(t))*SE(t) \qquad \text{Equations 4}$$

where $P_0(t_n)$ is the optical power at which the laser diode 3031 generates a "0" digital optical signal, and $P_1(t_n)$ is the optical power at which the laser diode 3031 generates a "1" digital optical signal.

(4d) Determine according the following Equation 5 whether the manually adjusted bias current $I_0(t_n)$ and modulation current $I_1(t_n)$ cause the laser diode 3031 to generate the expected extinction ratio $ER(t_n)$ at the normal temperature $t_n$:

$$ER(t_n)=10*\log(P_1(t_n)/P_0(t_n)). \qquad \text{Equation 5}$$

(4e) Once the manually adjusted bias current $I_0(t_n)$ and modulation current $I_1(t_n)$ cause the laser diode 3031 to generate the expected extinction ratio $ER(t_n)$ at the normal temperature $t_n$, the bias currents $I_0(t)$ and the modulation currents $I_1(t)$ in the entire temperature range are determined using the following Equations 6:

$$I_0(t)=I_{th}(t)+(I_0(t_n)-I_{th}(t_n))*(SE(t_n)/SE(t))$$

$$I_1(t)=I_{th}(t)+(I_1(t_n)-I_{th}(t_n))*(SE(t_n)/SE(t)). \qquad \text{Equations 6}$$

Now that the relationship between the optical power P(t) and the on-current I(t) of the laser diode over the entire temperature range has been obtained from the threshold currents $I_{th}(t)$ and the corresponding slope efficiencies SE(t) in the entire temperature range, the bias currents $I_0(t)$ and the modulation currents $I_1(t)$ in the entire temperature range can be determined using the above Equations 6.

Figure 5:
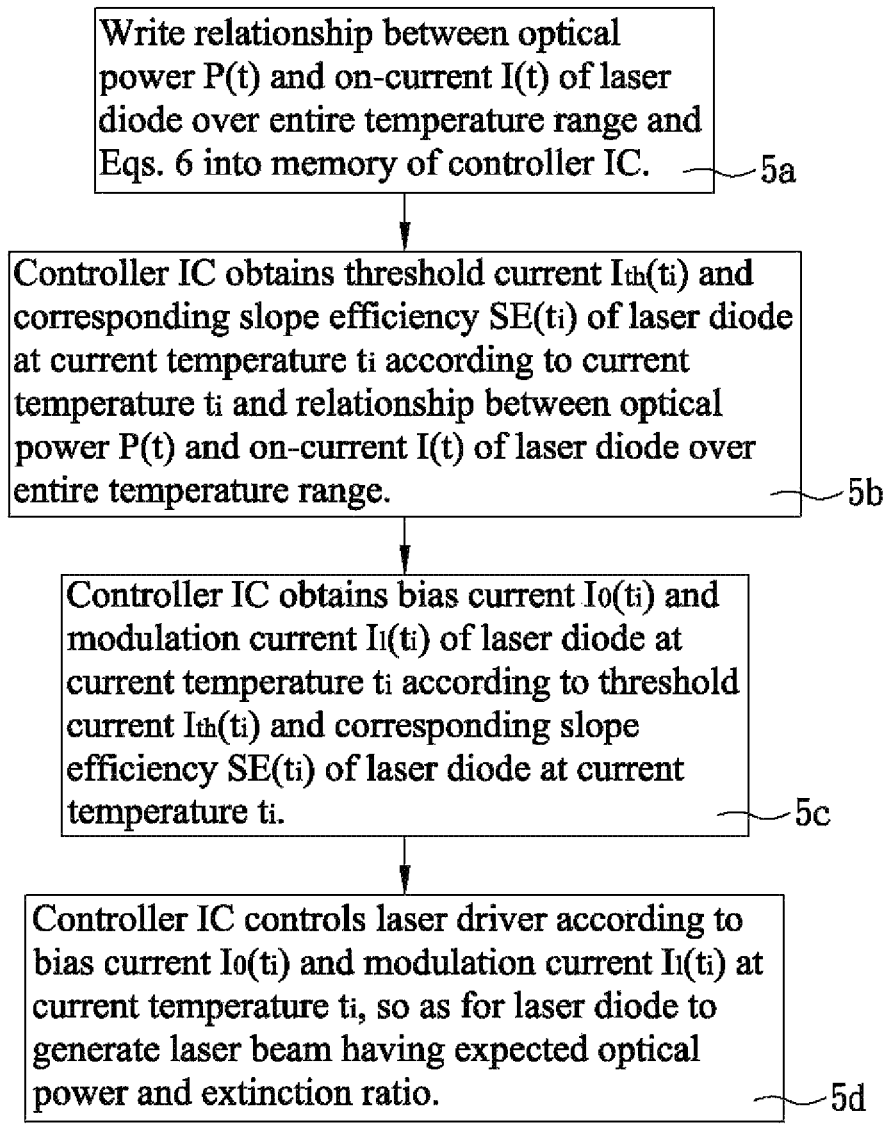
FIG. 5 is a flowchart of the steps for controlling a laser driver with a controller IC, so as for the laser diode to generate a laser beam having the expected optical power and extinction ratio.

After the relationship between the optical power P(t) and the on-current I(t) of the laser diode over the entire temperature range and the bias currents $I_0(t)$ and the modulation currents $I_1(t)$ in the entire temperature range are determined, the method of the present invention further includes the following steps as shown in FIG. 5:

(5a) The relationship between the optical power P(t) and the on-current I(t) of the laser diode over the entire temperature range and Equations 6 are written into a memory (not shown) of the controller IC 301 (or of the electronic device 500).

(5b) After the controller IC 301 obtains the current temperature $t_i$ of the laser diode 3031 through the thermal sensor 306, the controller IC 301 (or the electronic device 500) obtains the threshold current $I_{th}(t_i)$ and the corresponding slope efficiency $SE(t_i)$ of the laser diode 3031 at the current temperature $t_i$ according to the current temperature $t_i$ and the relationship between the optical power P(t) and the on-current I(t) of the laser diode 3031 over the entire temperature range.

(5c) Based on the threshold current $I_{th}(t_i)$ and the corresponding slope efficiency $SE(t_i)$ at the current temperature $t_i$, the controller IC 301 (or the electronic device 500) obtains the bias current $I_0(t_i)$ and the modulation current $I_1(t_i)$ of the laser diode 3031 at the current temperature $t_i$ according to the following equations:

$$I_0(t_i)=I_{th}(t_i)+(I_0(t_n)-I_{th}(t_n))*(SE(t_n)/SE(t_i))$$

$$I_1(t_i)=I_{th}(t_i)+(I_1(t_n)-I_{th}(t_n))*(SE(t_n)/SE(t_i)).$$

(5d) Finally, based on the bias current $I_0(t_i)$ and the modulation current $I_1(t_i)$ obtained in the previous step for the current temperature $t_i$, the controller IC 301 (or the electronic device 500) controls the laser driver 302 in such a way that the laser driver 302 drives the laser diode 3031 to generate a laser beam having the expected optical power and extinction ratio.

Thus, the present invention enables ready application of the fiber-optic transceiver 300 to a fiber-optic communication system, and the fiber-optic transceiver 300, though lacking a monitoring photodiode, a lookup table, and a closed-loop control circuit, can automatically control the optical power and extinction ratio of a laser beam over an entire temperature range and thereby keep the optical power and extinction ratio at the expected optimal levels.

While the invention herein disclosed has been described by means of specific embodiments, numerous modifications and variations could be made thereto by those skilled in the art without departing from the scope of the invention set forth in the claims.

What is claimed is:

1. A method for controlling optical power and extinction ratio over an entire temperature range, the method being applicable to a fiber-optic transceiver, wherein the fiber-optic transceiver is connected to an electronic device, is configured for generating or receiving a laser beam under control of the electronic device, and comprises a transmitter optical subassembly (TOSA), a laser driver, a controller IC, and a thermal sensor, the TOSA being provided therein with a laser diode but does not requiring require a monitoring photodiode, the laser driver being configured for driving the laser diode under control of the controller IC so as for the laser diode to generate a laser beam to be transmitted outward through an optical fiber, and the thermal sensor being configured for sensing a temperature of the laser diode, the method comprising the steps, performed by the controller IC, of:

receiving a relationship between an optical power P(t) and an on-current I(t) of the laser diode over an entire temperature range, receiving operation parameters including bias currents $I_0(t)$ and modulation currents $I_1(t)$ of the laser diode in the entire temperature range, and writing the relationship and the operation parameters into a memory of the controller IC; wherein the relationship is obtained through substituting manufacturer-provided characteristic data concerning threshold currents $I_{th}(t)$ and corresponding slope efficiencies SE(t) at a plurality of specific temperatures, of the fiber-optic transceiver or of the laser diode into a first equation and a second equation, respectively, as follows:

$$I_{th}(t)=I_0+K_1*\exp(t/t_1) \quad \text{the first equation:}$$

$$SE(t)=S_0-K_s*\exp(t/t_s), \quad \text{the second equation:}$$

to determine characteristic constants in the first and second equations by an approximation method and then determine the relationship according to threshold currents $I_{th}(t)$ and corresponding slope efficiencies SE(t) in the entire temperature range obtained from the first and second equations, respectively; wherein the characteristic constants in the first and second equations are $I_0$, $K_1$, $t_1$, $S_0$, $K_s$, and $t_s$; and wherein the operation parameters are obtained, through manually adjusting a bias current $I_0(t_n)$ and a modulation current $I_1(t_n)$ of the laser diode at a normal temperature $t_n$ so as for the laser diode to generate expected optical powers $P_0(t_n)$ and $P_1(t_n)$ at the normal temperature $t_n$, according to a third equation, as follows:

$$P(t)=(I(t)-I_{th}(t))*SE(t), \quad \text{the third equation:}$$

and
obtaining a current temperature $t_i$ of the laser diode through the thermal sensor, and controlling the laser driver according to the relationship, the operation parameters and the current temperature $t_i$, so that the laser driver drives the laser diode to generate a laser beam having an expected optical power and an expected extinction ratio.

2. The method of claim 1, wherein the bias current $I_0(t_n)$ and the modulation current $I_1(t_n)$ activate the laser diode to generate the optical powers $P_0(t_n)$ and $P_1(t_n)$ at the normal temperature $t_n$ according to a fourth equation and a fifth equation, respectively, as follows:

$$P_0(t_n)=(I_0(t_n)-I_{th}(t_n))*SE(t_n)=(I_0(t)-I_{th}(t))*SE(t) \quad \text{the fourth equation:}$$

$$P_1(t_n)=(I_1(t_n)-I_{th}(t_n))*SE(t_n)=(I_1(t)-I_{th}(t))*SE(t), \quad \text{the fifth equation:}$$

where $P_0(t_n)$ is an optical power at which the laser diode generates a "0" digital optical signal at the normal temperature $t_n$, and $P_1(t_n)$ is an optical power at which the laser diode generates a "1" digital optical signal at the normal temperature $t_n$.

3. The method of claim 2, wherein the bias current $I_0(t_n)$ and the modulation current $I_1(t_n)$ that activate the laser diode to generate an expected extinction ratio $ER(t_n)$ at the normal temperature $t_n$ is determined by a sixth equation, as follows:

$$ER(t_n)=10*\log(P_1(t_n)/P_0(t_n)) \quad \text{the sixth equation.}$$

4. The method of claim 3, wherein the bias currents $I_0(t)$ and the modulation currents $I_1(t)$ in the entire temperature range are determined according to a seventh equation and a eighth equation, respectively, as follows:

$$I_0(t)=I_{th}(t)+(I_0(t_n)-I_{th}(t_n))*(SE(t_n)/SE(t)), \quad \text{the seventh equation:}$$

$$I_1(t)=I_{th}(t)+(I_1(t_n)-I_{th}(t_n))*(SE(t_n)/SE(t)) \quad \text{the eighth equation:}$$

after the bias current $I_0(t_n)$ and the modulation current $I_1(t_n)$ activate the laser diode to generate the expected extinction ratio $ER(t_n)$ at the normal temperature $t_n$.

5. The method of claim 4, wherein the controller IC obtains a threshold current $I_{th}(t_i)$ and a corresponding slope efficiency $SE(t_i)$ of the laser diode at the current temperature $t_i$ according to the current temperature $t_i$ and the relationship between the optical power P(t) and the on-current I(t) of the laser diode over the entire temperature range, after the controller IC obtains the current temperature $t_i$ of the laser diode through the thermal sensor.

6. The method of claim 5, wherein the controller IC obtains the bias current $I_0(t_i)$ and modulation current $I^1(t_i)$ of the laser diode at the current temperature $t_i$ according to the threshold current $I_{th}(t_i)$ and the corresponding slope efficiency $SE(t_i)$ at the current temperature $t_i$ through a ninth equation and a tenth equation, respectively, as follows:

$$I_0(t_i)=I_{th}(t)+(I_0(t_n)-I_{th}(t_n))*(SE(t_n)/SE(t_i)) \quad \text{the ninth equation:}$$

$$I_1(t_i)=I_{th}(t_i)+I_1(t_n)-I_{th}(t_n)*(SE(t_n)/SE(t_i)) \quad \text{the tenth equation.}$$

* * * * *